(12) United States Patent
Tassinari et al.

(10) Patent No.: US 11,454,162 B2
(45) Date of Patent: Sep. 27, 2022

(54) REED VALVE AND REED VALVE AIRBOX

(71) Applicant: Moto Tassinari, Inc., West Lebanon, NH (US)

(72) Inventors: Steven M. Tassinari, Meridan, NH (US); Michael Ewaschuk, White River Junction, VT (US)

(73) Assignee: MOTO TASSINARI, INC., West Lebanon, NH (US)

( * ) Notice: Subject to any disclaimer, the term of this patent is extended or adjusted under 35 U.S.C. 154(b) by 0 days.

(21) Appl. No.: 17/249,748

(22) Filed: Mar. 11, 2021

(65) Prior Publication Data

US 2021/0285363 A1 Sep. 16, 2021

Related U.S. Application Data

(60) Provisional application No. 62/988,850, filed on Mar. 12, 2020.

(51) Int. Cl.
 *F02B 33/44* (2006.01)
 *F02B 37/16* (2006.01)
 (Continued)

(52) U.S. Cl.
 CPC ............ *F02B 33/446* (2013.01); *F01L 3/205* (2013.01); *F02B 37/16* (2013.01);
 (Continued)

(58) Field of Classification Search
 CPC ...... F16K 15/16; F01L 3/205; F04B 39/1073; Y10S 137/904; Y10T 137/7891; F02B 33/446; F02B 37/16; F02D 41/0007
 See application file for complete search history.

(56) References Cited

U.S. PATENT DOCUMENTS 3,286,728 A * 11/1966 Stephenson ............. F16K 15/16
 137/856
4,195,660 A * 4/1980 Taipale ................... F16K 15/16
 137/512.1
(Continued)

FOREIGN PATENT DOCUMENTS

EP      1098085 A2    5/2001
WO   2019101974 A1   11/2018

OTHER PUBLICATIONS

International Search Report and Written Opinion of International Application No. PCT/US2021/70263, dated Jun. 9, 2021, 12 pages.

*Primary Examiner* — J. Todd Newton
(74) *Attorney, Agent, or Firm* — Grossman, Tucker, Perreault & Pfleger PLLC; Paul J. Kroon, Jr.

(57) ABSTRACT

A reed valve includes a first valve body portion that includes one or more inlet apertures fluidly coupled to a tapered second valve body portion that includes one or more outlet apertures. The reed valve includes at least one sealing surface disposed proximate the one or more outlet apertures and at least one petal continuously, reversibly, displaceable between an OPEN position permitting forward flow through the reed valve when a fluid pressure proximate the at least one inlet aperture exceeds a fluid pressure proximate the at least one outlet aperture and a CLOSED position preventing reverse flow through the reed valve when a fluid pressure proximate the at least one outlet aperture exceeds a fluid pressure proximate the at least one inlet aperture. The reed valve may be installed in an airbox assembly used with a turbocharged engine to reduce the occurrence of turbo-lag on acceleration.

11 Claims, 10 Drawing Sheets

(51) Int. Cl.
*F02D 41/00* (2006.01)
*F01L 3/20* (2006.01)
*F02M 26/70* (2016.01)
*F16K 15/03* (2006.01)

(52) U.S. Cl.
CPC ......... *F02D 41/0007* (2013.01); *F02M 26/70* (2016.02); *F16K 15/031* (2013.01)

(56) References Cited

U.S. PATENT DOCUMENTS

| | | | | |
|---|---|---|---|---|
| 4,228,770 A * | 10/1980 | Boyesen | ................ | F01L 3/205 123/188.1 |
| 4,235,206 A * | 11/1980 | Boyesen | ................ | F01L 3/205 123/73 V |
| 4,290,455 A * | 9/1981 | Honda | ................ | F01L 3/205 137/512.15 |
| 4,445,336 A * | 5/1984 | Inoue | ................ | F02B 37/00 60/605.1 |
| 4,633,825 A * | 1/1987 | Flaig | ................ | F01L 3/205 123/73 V |
| 4,643,139 A * | 2/1987 | Hargreaves | ................ | F01L 3/205 123/65 V |
| 4,696,263 A * | 9/1987 | Boyesen | ................ | F01L 3/205 123/65 V |
| 4,712,520 A * | 12/1987 | Pasquin | ................ | F02B 33/24 123/73 S |
| 4,836,151 A * | 6/1989 | Litjens | ................ | F01L 3/205 123/65 V |
| 4,879,976 A * | 11/1989 | Boyesen | ................ | F01L 3/205 123/65 V |
| 5,018,486 A * | 5/1991 | Davis | ................ | F02B 29/02 123/184.47 |
| 5,036,806 A * | 8/1991 | Rarick | ................ | F01L 3/205 123/65 V |
| 5,103,867 A * | 4/1992 | Wu | ................ | F01L 3/205 123/184.54 |
| 5,143,027 A * | 9/1992 | Bergeron | ................ | F01L 3/205 123/65 V |
| 5,176,170 A * | 1/1993 | Boyesen | ................ | F01L 3/205 123/65 V |
| 5,243,934 A * | 9/1993 | Boyesen | ................ | F01L 3/205 123/65 V |
| 5,245,956 A * | 9/1993 | Martin | ................ | F01L 3/205 123/73 V |
| 5,247,912 A * | 9/1993 | Boyesen | ................ | F01L 3/205 123/65 V |
| 5,253,617 A * | 10/1993 | Fitzpatrick | ................ | F01L 3/205 123/184.54 |
| 5,370,088 A * | 12/1994 | Nakamura | ................ | F01L 3/205 123/65 V |
| 5,373,867 A * | 12/1994 | Boyesen | ................ | F01L 3/205 123/73 V |
| 5,390,699 A * | 2/1995 | Yamada | ................ | F01L 3/205 123/73 V |
| 5,421,368 A * | 6/1995 | Maalouf | ................ | F04C 29/12 137/856 |
| 5,454,397 A * | 10/1995 | Miszczak | ................ | F04B 39/1073 137/512 |
| 5,655,898 A * | 8/1997 | Hashimoto | ................ | F04B 39/1073 137/855 |
| 5,794,654 A * | 8/1998 | Marvonek | ................ | F01L 3/205 137/512.15 |
| 6,880,577 B2 | 4/2005 | Tassinari et al. | | |
| 7,047,918 B1 * | 5/2006 | Polimeni, Jr. | ................ | F01L 3/205 123/73 V |
| 7,614,422 B2 | 11/2009 | Tassinari et al. | | |
| 7,963,265 B2 | 6/2011 | Tassinari et al. | | |
| 10,760,475 B2 * | 9/2020 | Joyce | ................ | F02B 29/0406 |
| 2002/0056480 A1* | 5/2002 | Moller | ................ | F16K 15/16 137/856 |
| 2003/0019527 A1* | 1/2003 | Oppermann | ................ | F16K 15/031 137/512.15 |
| 2003/0066511 A1* | 4/2003 | Heulitt | ................ | F16K 15/063 123/306 |
| 2003/0085532 A1* | 5/2003 | Spiegl | ................ | F04B 39/1033 277/650 |
| 2003/0209275 A1* | 11/2003 | Tassinari | ................ | F01L 3/205 137/855 |
| 2004/0127154 A1* | 7/2004 | Omiya | ................ | B60H 1/249 454/162 |
| 2006/0219300 A1* | 10/2006 | Tassinari | ................ | F16K 15/16 137/512.15 |
| 2014/0174398 A1 | 6/2014 | Burgess et al. | | |

* cited by examiner

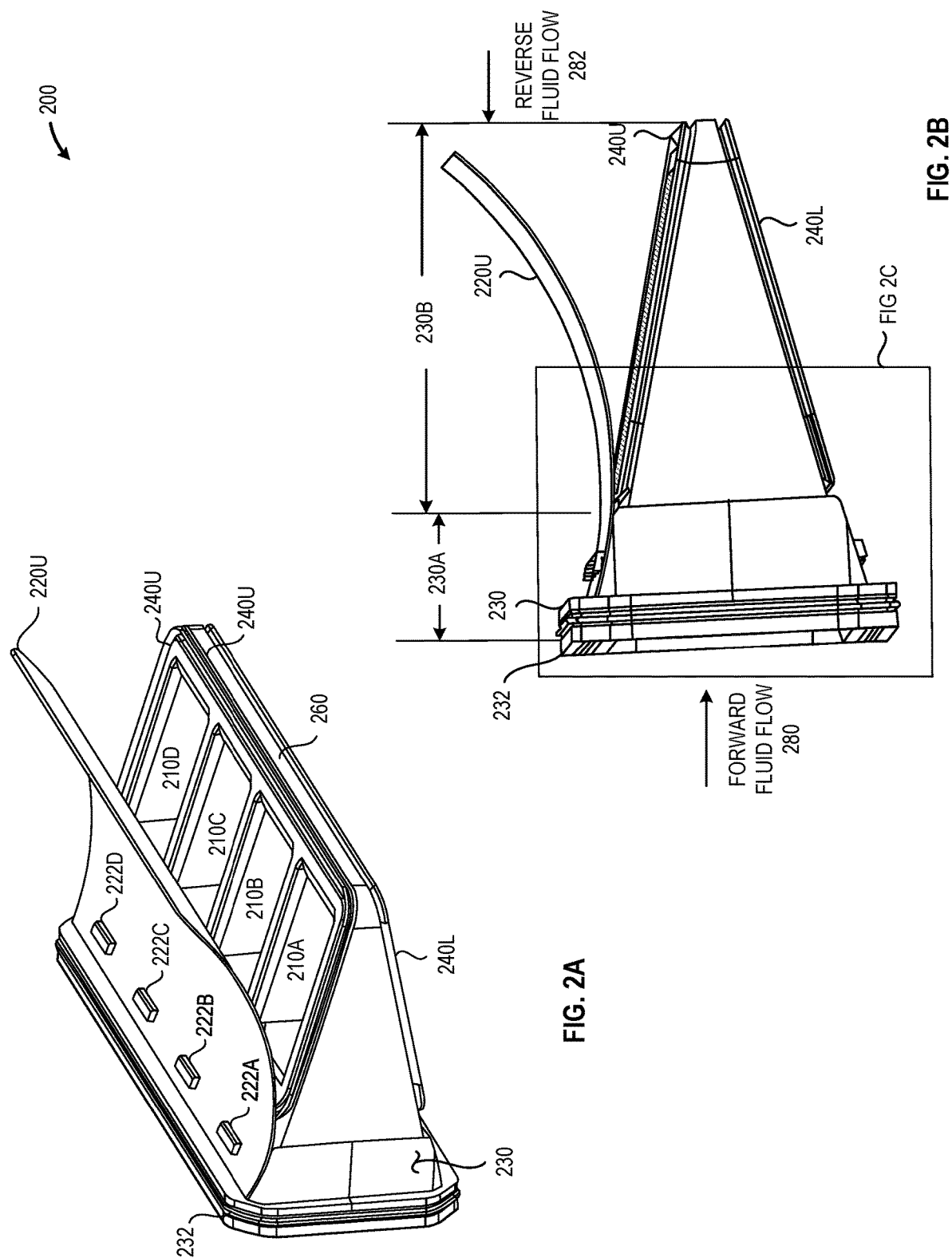

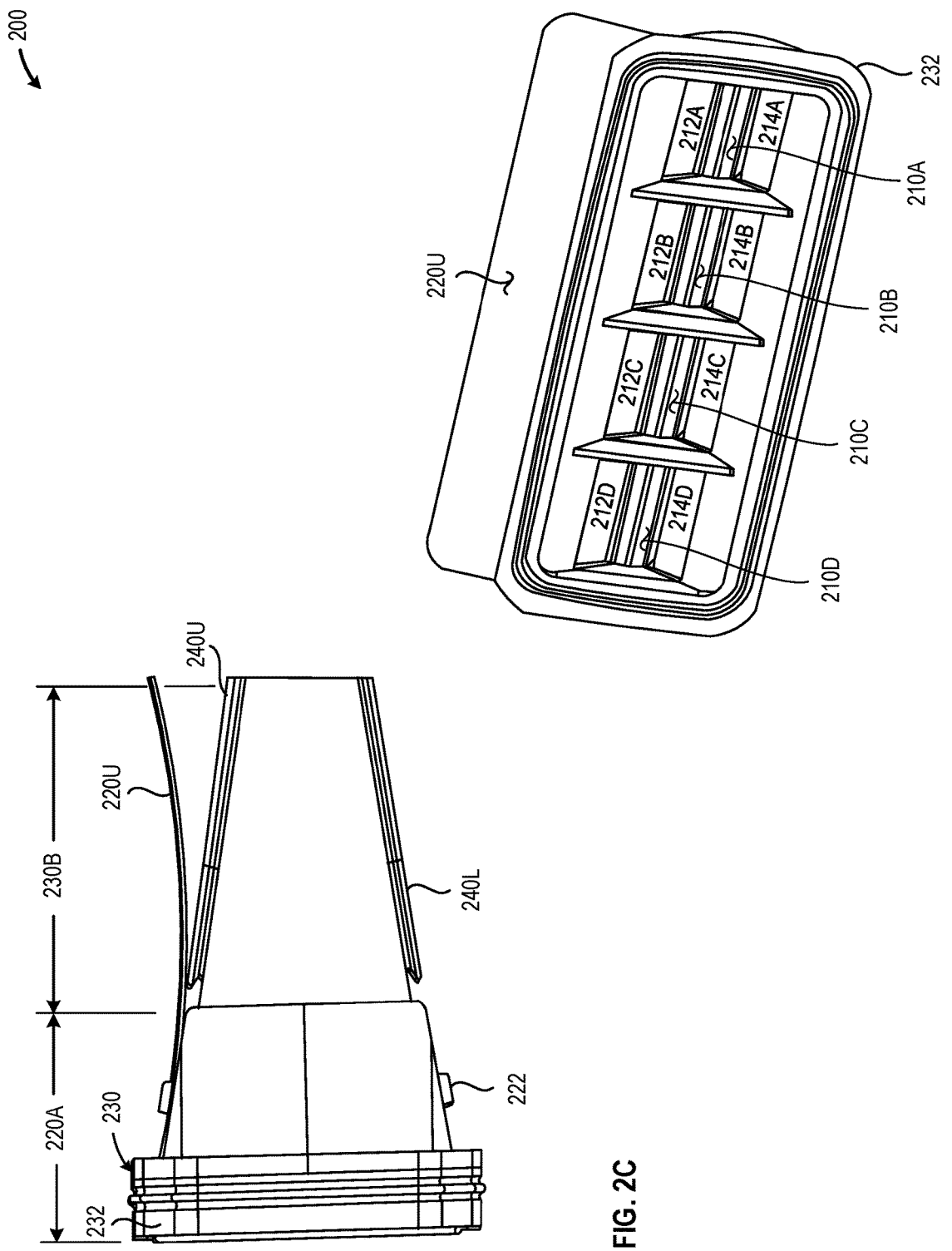

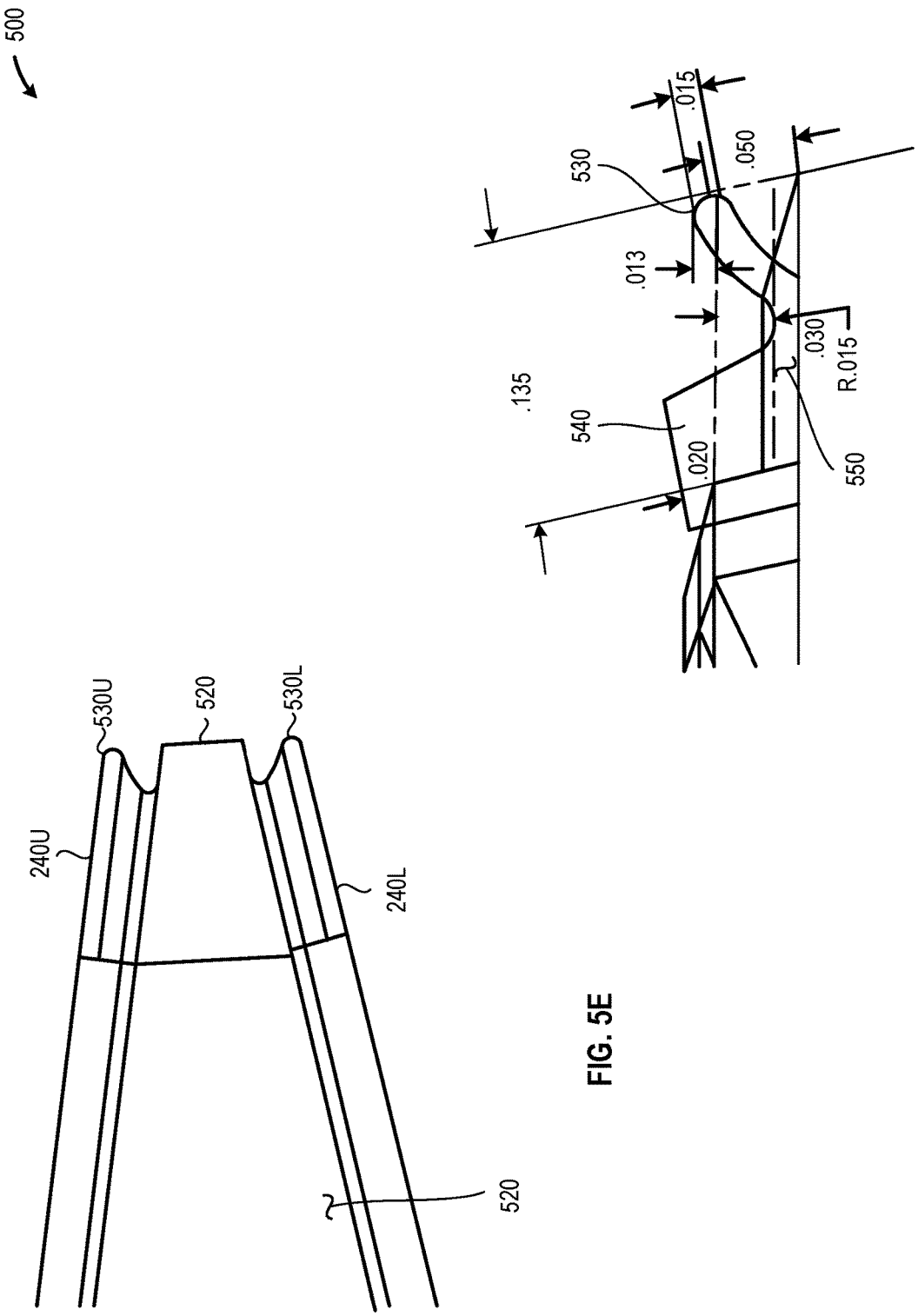

REED VALVE AND REED VALVE AIRBOX

CROSS REFERENCE TO RELATED APPLICATIONS

The present disclosure claims the benefit of U.S. Provisional Patent Application Ser. No. 62/988,850 filed Mar. 12, 2020, which is fully incorporated herein by reference.

TECHNICAL FIELD

The present disclosure is generally directed to engine parts and more particularly to the field of reed valves assemblies having improved sealing.

BACKGROUND INFORMATION

Reed valves have been used in two stroke engine applications to control the fuel-air mixture flow from the carburetor to the cylinder(s). The reed valve opens, permitting flow through the valve, when exposed to a downstream negative pressure/vacuum (e.g., piston moving down), and closes preventing flow through the valve when exposed to a downstream positive pressure (e.g., piston moving up). Operation of the engine (e.g., movement of the piston within the cylinder) causes a change in the intake pressures. For example, in a two-stroke engine, during the compression stroke the upward motion of the piston creates a vacuum in the crankcase drawing the fuel/air mixture into the engine, during the power stroke the downward motion of the piston draws the fuel/air mixture from the crankcase into the cylinder and increases the pressure in the crankcase causing the reed valve to close, preventing the flow of fuel/air mixture into the crankcase.

Increasing the quantity of air introduced into the cylinder (s) increases the power output of an engine. Turbochargers and superchargers are frequently used to increase the pressure, and consequently the volume, of air introduced to the cylinder(s). A turbocharger includes an exhaust driven turbine coupled to an inlet air compressor. In contrast, a supercharger is an externally driven inlet air compressor. By increasing the power output of the engine, turbochargers are able to improve the efficiency of the engine. Using a turbocharger, a fuel/air mixture is introduced to a cylinder, compressed by an upward piston stroke, and ignited causing a downward piston stroke, providing a power output via a crankshaft. The exhaust gas exits the cylinder under pressure and flows through the turbocharger. The compressor draws air (e.g., atmospheric air) and forces air into the engine, thereby increasing the efficiency and/or power output of the engine.

While turbochargers are generally effective at increasing the efficiency and/or power output of the engine, turbochargers can suffer from what is referred to as "turbo lag." For example, the flow of exhaust gas through the exhaust system may be insufficient to drive the turbocharger in certain circumstances (e.g., low engine rpms) thereby resulting in the turbocharger not rotating fast enough to provide air in sufficient quantity to noticeably increase the power output of the engine. Turbo-lag may be particularly problematic when using a relatively large turbocharger for a given engine application.

BRIEF DESCRIPTION OF THE DRAWINGS

These and other features and advantages will be better understood by reading the following detailed description, taken together with the drawings, wherein:

FIG. 2A is perspective view of an illustrative reed valve in an open position or state and in which the reed valve includes at least a valve body having one or more passageways formed therethrough, one or more upper petals, and one or more upper sealing surfaces, and one or more lower sealing surfaces, in accordance with at least one embodiment described herein;

FIG. 2B is a side elevation of the illustrative reed valve depicted in FIG. 2A, in accordance with at least one embodiment described herein;

FIG. 2C is a partial detail view of the portion of the illustrative reed valve depicted in FIGS. 2A and 2B, in accordance with at least one embodiment described herein;

FIG. 2D is a rear view of the illustrative reed valve depicted in FIGS. 2A-2C that includes a plurality of passageways, each having a respective upper aperture and a respective lower aperture, in accordance with at least one embodiment described herein;

FIG. 5E is a dimensioned side elevation sectional view of an example sealing surface, in accordance with at least one embodiment described herein;

FIG. 5F is a partial sectional view of an example sealing surface, in accordance with at least one embodiment described herein;

DETAILED DESCRIPTION

Figure 1:
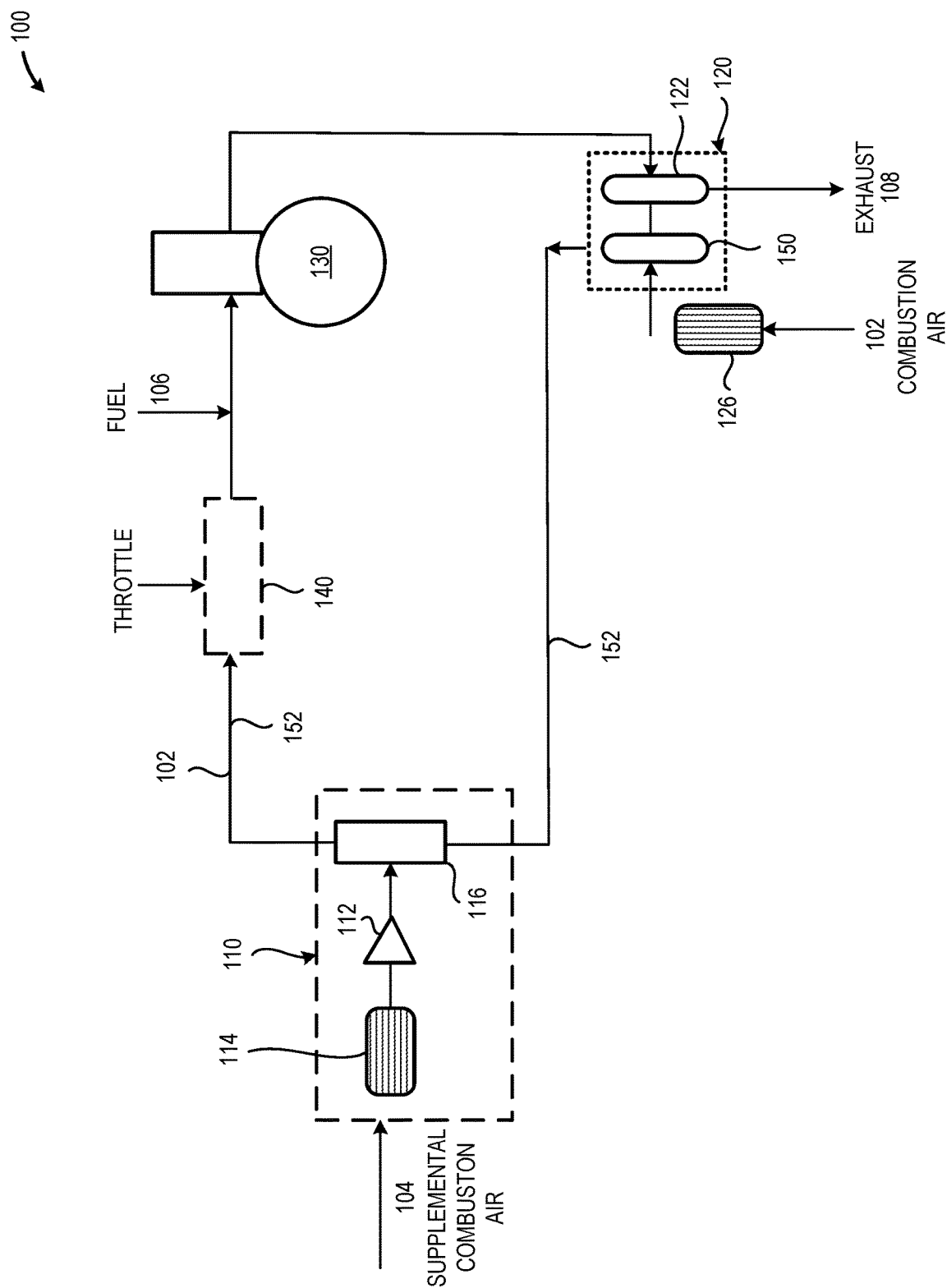
FIG. 1 is a block diagram depicting an illustrative turbocharged engine system incorporating an airbox assembly that includes a reed valve coupled between a turbocharger assembly and one or more cylinders in an engine, in accordance with at least one embodiment described herein.

The systems and methods disclosed herein provide a reed valve and/or an airbox assembly capable of beneficially and advantageously assisting in minimizing the transient reduction in engine output power attributable to turbocharger lag ("turbo-lag"). The systems and methods disclosed herein provide a supplemental combustion air inlet that includes a reed valve disposed between the turbocharger and an engine containing one or more cylinders. The reed valve opens under a positive differential pressure (inlet pressure>outlet pressure) to provide supplemental combustion air to the engine during the transient period as the turbocharger spools, and closes under a negative differential pressure (outlet pressure>inlet pressure) when the turbocharger builds combustion air pressure. In some embodiments, the reed valve may function as a one-way or check valve that allows a flow of supplemental combustion air into an airbox assembly fluidly coupled to the engine. However, those of skill in the relevant arts should readily appreciate that the reed valves and/or airbox assemblies disclosed herein may also be used in many different applications such as in place of a traditional reed valve bolted directly to a 2-stroke engine case or as a reed valve in 4-stroke exhausts to mitigate noise/emissions. The reed valve disclosed herein may include a lip seal type feature just inside of the reed petal's perimeter edge for improved sealing. The lip may also be asymmetric top and bottom, having less interference at the base and more at the tip, other otherwise variable in its interference with the reed petal along the length of the seal.

A reed valve is provided. The reed valve may include: a valve body having one or more passageways formed therethrough, each of the one or more passageways including at least one inlet aperture and at least one outlet aperture; at least one sealing surface disposed at partially about each of the at least one outlet apertures; and at least one petal located and affixed to the valve body such that the at least one petal reversibly and continuously moves between: an open position where a gap forms between the at least one petal and the at least one sealing surface upon application of a positive forward pressure differential between the at least one inlet aperture and the at least one outlet aperture, permitting forward flow through the one or more passageways; and a closed position where the at least one petal is disposed proximate the at least one sealing surface upon application of a negative forward pressure differential between the at least one inlet aperture and the at least one outlet aperture, preventing reverse flow through the one or more passageways (i.e., the at least one petal is flexibly coupled to the valve body meaning that the pedal is secured to the valve body and flexes/bends relative to the valve body as the pedal moves between the OPEN and CLOSED positions).

An airbox assembly is provided. The airbox assembly may include: a housing defining a mixing region having an inlet to receive combustion air and an outlet to discharge the combustion air having an inlet and an outlet; and a reed valve fluidly coupled to the mixing region to permit the flow of ambient air into the mixing region, the reed valve including: a valve body having one or more passageways formed therethrough, each of the one or more passageways including at least one inlet aperture fluidly coupled to an ambient air inlet and at least one outlet aperture; at least one sealing surface disposed at partially about each of the at least one outlet apertures; and at least one petal flexibly coupled to the valve body, the at least one petal to reversibly and continuously move between: an open position where a gap forms between the at least one petal and the at least one sealing surface upon application of a positive forward pressure differential between the at least one inlet aperture and the at least one outlet aperture, permitting forward flow through the one or more passageways; and a closed position where the at least one petal is disposed proximate the at least one sealing surface upon application of a negative forward pressure differential between the at least one inlet aperture and the at least one outlet aperture, preventing reverse flow through the one or more passageways.

A turbocharged engine system is provided. The system may include: an engine having one or more cylinders and fuel/air inlet system and an exhaust manifold; a turbocharger assembly that includes: a turbine portion fluidly coupled to the exhaust manifold; and a compressor portion to provide combustion air to the engine; an airbox assembly fluidly coupled to the turbocharger assembly, the airbox assembly to receive the combustion air from the turbocharger assembly, the airbox assembly including: a housing defining a mixing region having an inlet to receive combustion air and an outlet to discharge the combustion air having an inlet and an outlet; and a reed valve fluidly coupled to the mixing region to permit the flow of ambient air into the mixing region, the reed valve including: a valve body having one or more passageways formed therethrough, each of the one or more passageways including at least one inlet aperture fluidly coupled to an ambient air inlet and at least one outlet aperture; at least one sealing surface disposed at partially about each of the at least one outlet apertures; and at least one petal flexibly coupled to the valve body, the at least one petal to reversibly and continuously move between: an open position where a gap forms between the at least one petal and the at least one sealing surface upon application of a positive forward pressure differential between the at least one inlet aperture and the at least one outlet aperture, permitting forward flow through the one or more passageways; and a closed position where the at least one petal is disposed proximate the at least one sealing surface upon application of a negative forward pressure differential between the at least one inlet aperture and the at least one outlet aperture, preventing reverse flow through the one or more passageways; and a throttle body fluidly coupled between the airbox assembly and the engine, the throttle body to control the flow of combustion air to the engine.

FIG. 1 is a block diagram depicting an illustrative turbocharged engine system 100 incorporating an airbox assembly 110 that includes a reed valve 112 coupled between a turbocharger assembly 120 and one or more cylinders in an engine 130, in accordance with at least one embodiment described herein. As depicted in FIG. 1, the flow of exhaust gas 108 produced by the engine 130 causes a turbine 122 in the turbocharger assembly 120 to rotate. The turbine 122 is physically coupled to a compressor 150 which draws combustion air 102 through filter 126, and increases the pressure of the discharged combustion air 102. The compressed combustion air flows through a throttle body 140 that controls the flow of a fuel/air mixture into the engine 130, thereby enhancing the power output of the engine 130. When the operator increases the throttle to provide additional fuel/air mixture to the engine 130, the time required for the turbocharger assembly 120 to increase the combustion air pressure at the increased throttle position is referred to as "turbo-lag."

The effect of turbo-lag can be minimized using an airbox assembly 110 as depicted in FIG. 1. As the throttle body 140 opens and the fuel/air mixture flow to the engine 130 increases, air pressure in the conduit 152 coupling the turbocharger 130 to the engine 130 drops. The transient sub-atmospheric pressure condition in the conduit 152 created by the increased air demand created by the opened throttle creates a positive differential pressure (inlet pressure>outlet pressure) across the reed valve 112, causing the reed valve 112 to open permitting the flow of supplemental combustion air 104 through the reed valve 112, through the throttle body 140, and into the engine 130. When the combustion air pressure in the conduit 152 increases above ambient atmospheric pressure creating a negative differential pressure (outlet pressure>inlet pressure) across the reed valve 112, causing the reed valve 112 to close, allowing the engine 130 to receive the full pressure boost provided by the turbocharger 120. Beneficially, the reed valve 112 opens to allow supplemental combustion air as the turbocharger 120 spools and closes after the turbocharger 120 spools and provides pressurized combustion air to the engine 130 without requiring any intervention by the vehicle operator.

The airbox assembly 110 may include one or more reed valves 112, one or more air filters 114 supplying air to the one or more reed valves 112, and a mixing zone 116 where the supplemental combustion air 104 provided by the one or more improved reed valves 112 mixes with the combustion air 102 supplied by the turbocharger 120. The reed valve 112 is described in greater detail in FIGS. 2-5, however in its most basic form, the reed valve 112 includes a valve body having at least in inlet aperture and at least one outlet aperture. One or more displaceable and/or flexible petals cover the outlet aperture. The reed valve 112 includes an enhanced sealing surface between the one or more petals and the valve body. When pressure at the outlet aperture is less than the pressure at the inlet aperture, the one or more petals open the outlet aperture permitting flow through the reed valve 112. When pressure at the inlet aperture is less than the pressure at the outlet aperture of the reed valve 112, the one or more petals contact the enhanced sealing surface, minimizing or even preventing flow through the improved reed valve 112.

The reed valve 112 may be coupled, mounted, disposed at least partially within, and/or otherwise secured in, on, or about the airbox assembly 110. For example, one or more reed valves 112A-112n may be directly coupled to the frame of the airbox assembly 110. The reed valve 112 may be secured to the frame/housing of the airbox assembly 110 using one or more fasteners such as, but not limited to, bolts, clamps, screws, friction fits, tabs, snap fits, welding, or the like. In one example, at least a portion of the reed valve 112 may be disposed within a cavity formed in the airbox assembly 110, such as, a cavity defined, at least in part, by the frame/housing. Alternatively (or in addition), one or more of the reed valves 112 may be disposed external to the airbox assembly 110. For example, a reed valve 112 may be coupled to an intake boot/conduit or similar structure or assembly coupled to the air box assembly 110 between the turbocharger 120 and the throttle body 140. As such, the reed valve 112 may be disposed at least partially internal to the airbox assembly 110, at least partially external to the airbox assembly 110, or any combination thereof, while still providing an alternative pathway for atmospheric air to enter the airbox assembly 110 and/or conduit 152.

The reed valve 112 opens upon formation of a positive differential pressure across the reed valve 112, for example when the pressure in the conduit 152 (i.e., the outlet pressure at the reed valve 112) is less than ambient pressure (i.e., the inlet pressure at the reed valve 112). The pressure in the conduit 152 may be affected by the position of the throttle body 140—when the throttle position is increased (e.g., when the engine speed and/or power demand is increased) the increased combustion air flow through the throttle body 140 may cause a transient pressure drop within the conduit 152. For example, when the pressure in the conduit 152 is under vacuum (e.g., a pressure in the conduit 152 is less then substantially atmospheric pressure), the reed valve 112 opens, thereby allowing supplemental combustion air 104 to flow into the conduit 152. Admitting supplemental combustion air 104 into the conduit 152 provides a greater volume of combustion air to the engine 130 consequently increasing the volume of exhaust gas 108. As the volume of exhaust gas 108 passing through the turbine 122 increases, the speed of the turbine 122 and compressor 150 increases, thereby increasing the volume of combustion air 102 discharged by the turbocharger assembly 120 to the conduit 152. Once the combustion gas pressure 102 in the conduit 152 increases above the pressure of the supplemental combustion air 104 (e.g., the outlet pressure at the reed valve 112 exceeds the substantially atmospheric inlet pressure at the reed valve 112), the reed valve 112 closes. Consequently, the higher-pressure combustion air 102 present in the conduit 152 does not escape through the airbox assembly 110 and is instead forced into the engine 130. As used herein, the term "substantially atmospheric pressure" is intended to mean +/−20% of ambient atmospheric pressure.

The at least one air filter 114 minimizes the quantity of particulates and/or other contaminants flowing into the conduit 152 damaging or compromising the operation of the throttle body 140 and/or the engine 130. The supplemental combustion air 104 flowing through reed valve 112 mixes with the combustion air 102 received from the turbocharger assembly 120 in the mixing zone 116. In embodiments, the mixing zone 116 may include one or more static flow mixing devices to create turbulence and improve mixing of the combustion air 102 with the supplemental inlet air 104. The combined combustion air 102 and supplemental combustion air 104 flow through the throttle body 140. A positionable element, such as a butterfly valve, disposed within the throttle body 140 controls the volume of combustion air provided to the engine 130. The throttle body 140 may include various apertures or orifices to permit the passage of small quantities of combustion air such that the engine 130 remains running in an "idle" state when the valve in the throttle body is closed. Fuel 106, such as one or more liquid or gaseous hydrocarbons such as diesel, gasoline, and/or natural gas mixes with the combustion air exiting the throttle body 140 to provide a combustible fuel/air mixture to the engine 130.

The engine 130 may include a single- or multi-cylinder, two-stroke or four-stroke engine. In at least some embodiments, the engine 130 may include a two-stroke engine having one or more reed valves 112 operably coupled to the crankcase of the engine 130. Within the engine 130, the fuel/air mixture is combusted to produce an exhaust gas 108 that is removed from the engine 130. In embodiments, the exhaust gas 108 may pass through one or more emission control devices and/or one or more noise attenuation devices.

The exhaust gas 108 flows into the turbine 122 portion of the turbocharger assembly 120. The flow of exhaust gas 108 through the turbine 122 causes the rotation of the turbine 122 and the compressor 150 operably coupled to the turbine 122. The compressor 150 draws in ambient air (e.g., air at substantially atmospheric pressure) and discharges combustion air 102 at an increased pressure (e.g., air at a pressure greater than atmospheric pressure) into the conduit 152. Increasing the pressure of the combustion air supplied to the engine 130 increases the oxygen available for combustion in the engine, thereby permitting a greater fuel feed rate to the engine 130 to increase the power output of the engine 130 when compared to a non-turbocharged engine 130. It should be appreciated that while the airbox assembly 110 and throttle body 140 are depicted downstream of the turbocharger 120 in FIG. 1, in other embodiments, the airbox assembly 110 and/or throttle body 140 may be disposed at any location and in any configuration in conduit 152.

FIG. 2A is perspective view of an illustrative reed valve 200 in an open position or state and in which the reed valve 200 includes at least a valve body 230 having one or more passageways 210A-210D (collectively, "passageways 210") formed therethrough, one or more upper petals 220U, and one or more upper sealing surfaces 240U, and one or more lower sealing surfaces 240L, in accordance with at least one embodiment described herein. FIG. 2B is a side elevation of the illustrative reed valve 200 depicted in FIG. 2A, having a valve body 230 with a first valve body portion 230A that includes the reed valve inlet and a second valve body portion 230B that includes one or more outlet apertures, in accordance with at least one embodiment described herein. FIG. 2C is a partial detail view of the portion of the illustrative reed valve 200 depicted in FIGS. 2A and 2B, in accordance with at least one embodiment described herein. FIG. 2D is a rear view of the illustrative reed valve 200 depicted in FIGS. 2A-2C that includes a plurality of passageways 210A-210D, each having a respective upper aperture 212A-212D (collectively, "upper apertures 212") and a respective lower aperture 214A-214D (collectively, "lower apertures 214"), in accordance with at least one embodiment described herein. It should be appreciated that the reed valve 200 may include only one petal 220, either upper or lower petals.

In embodiments, the illustrative reed valve 200 may include a valve body 230, one or more upper petals 220U, one or more lower petals 220L (not shown in FIGS. 2A-2D), one or more upper sealing surfaces 240U, and one or more lower sealing surfaces 240L. In embodiments, the one or more upper petals 220U contact and seal against the one or more upper sealing surfaces 240U. Similarly, in embodiments, the one or more lower petals 220L contact and seal against the one or more lower sealing surfaces 240L. By contacting the upper and the lower sealing surfaces 240, the upper and the lower petals 220 minimize or even prevent backflow through reed valve 200. In embodiments, the valve body 230 may include one or more sealing devices 232 to seal the gap between the reed valve 200 and the airbox assembly 110 to prevent flow bypass or leakage around the reed valve 200. In embodiments, the reed valve 200 may include a first valve body port 230A that includes the one or more inlet apertures and a second valve body portion that includes the one or more upper outlet apertures 212 and/or one or more lower outlet apertures 214. The valve body 230 and the one or more upper petals 220U and/or one or more lower petals 220L may include any reed valve design known to those skilled in the art. For example, the valve body 230 and the one or more petals 220 may include any design described in U.S. Pat. Nos. 6,880,577, 7,614,422, and 7,963,265, all of which are fully incorporated herein by reference. It should be appreciated that the illustrative reed valve 200 is depicted in FIGS. 2A-2D with only a single upper petal 220U disposed above an upper aperture 212A-212D in each of the plurality of passageways 210A-210D formed in the valve body 230, however, it should be appreciated that the reed valve 200 may include one or more additional lower petals 220L disposed beneath or below each of some or all of the lower apertures 214A-214D such that flow is able to exit the illustrative improved reed valve 112 from both the upper aperture 212 in each passageway 210 and the lower aperture 214 in each passageway 210. The petals may have alternate geometry as required to meet the desired design and performance requirements of the application. The reed valve 200 depicted in FIGS. 2A-2C includes a plurality of passageways 210A-210D, each having both an upper aperture 212A-212D and a lower aperture 214A-214D. An upper petal 220U covers the upper aperture of each of the plurality of passageways 210A-210D and seals against an upper sealing surface 240U extending about the periphery of the plurality of passageways 210A-210D. To better illustrate the lower seal 240L, the lower petal 220L has been omitted in each of FIGS. 2A-2D.

Figure 3B:
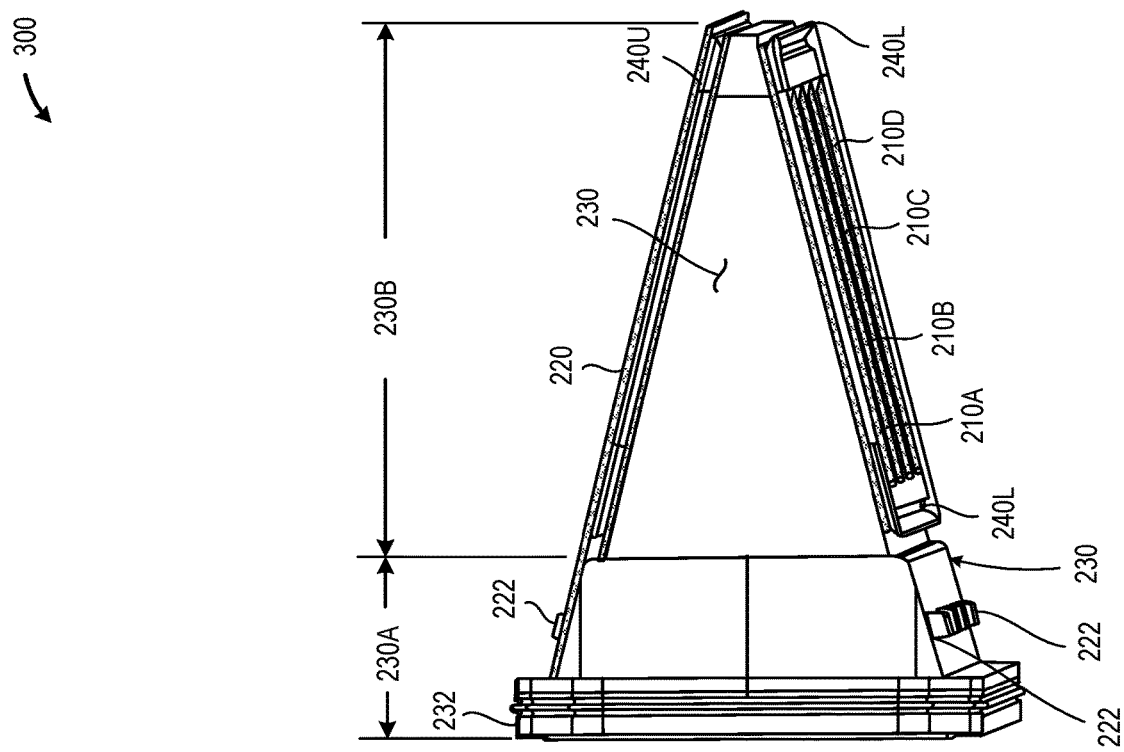
FIG. 3B is a lower perspective view of the illustrative reed valve depicted in FIG. 3A and in which the lower apertures of each of the plurality of passageways is visible, in accordance with at least one embodiment described herein.
Figure 3A:
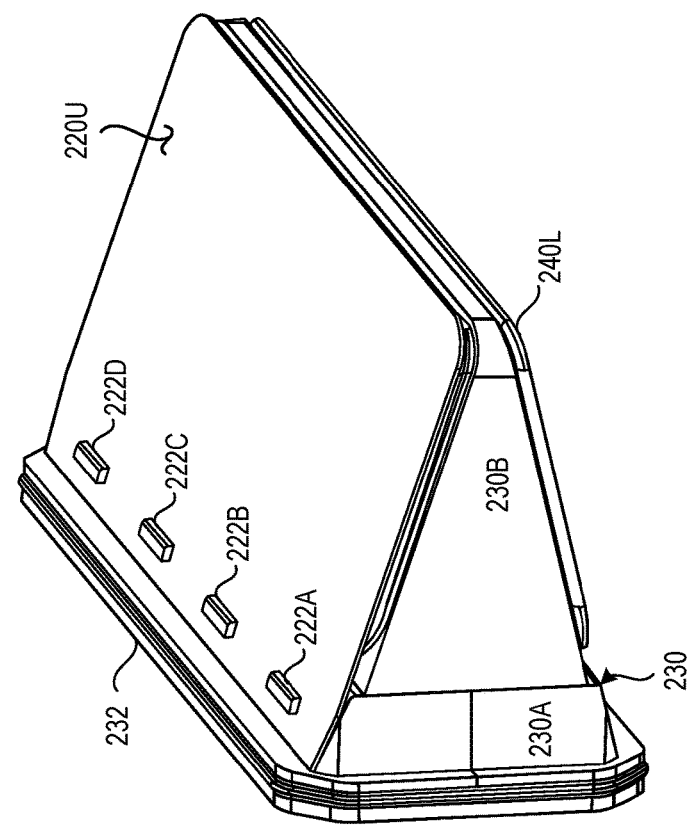
FIG. 3A is perspective view of an illustrative reed valve in which the upper petal is depicted in a CLOSED position or state, in accordance with at least one embodiment described herein.

The passageways 210A-210D permit fluid flow (e.g., air and/or air-fuel, and/or air-oil and/or air-fuel-oil mixes) through the valve body 230. The one or more upper petals 220U and the one or more lower petals 220L are independently, reversibly, and continuously, displaceable between an OPEN state or position (as depicted in FIGS. 2A-2D) in which forward fluid flow 280 through the passageways 210A-210D is permitted and a CLOSED state or position (e.g., as depicted in FIGS. 3A and 3B) in which reverse fluid flow 282 through the passageways 210A-210D is prevented. In embodiments, the reed valve 200 may include one or more passageways 210 having an upper aperture 212A-212D through which fluid may flow, a lower aperture 214A-214D through which fluid may flow, or both upper and lower apertures through which fluid may flow. In the example reed valve 200 depicted in FIGS. 2A-2D, the reed valve 200 includes a plurality of passageways 210A-210D, each having a respective upper aperture 212A-212D and a respective lower aperture 214A-214D.

The one or more upper sealing surfaces 240U seal the one or more upper petals 220U to the valve body. The one or more lower sealing surfaces 240L seal the one or more lower petals 220L to the valve body 230. This is particularly beneficial in forced-air (e.g., pressurized) systems such as an engine intake system for example, an airbox assembly 110 used in conjunction with a turbocharged engine 130. The upper and/or lower sealing surfaces 240 may include a material that has been overmolded about a portion of the valve body 230. The overmold material used to provide the one or more upper sealing surfaces 240U and the one or more lower sealing surfaces 240L may include one or more elastomeric or flexible materials. The overmold material may include but is not limited to: epichlorohydrin, butadiene nitrile rubber, silicon or elastomeric compound with similar properties and ability to achieve various durometers and ability to have subtle compounding changes to alter the performance. The overmold material used to provide the one or more upper sealing surfaces 240U and the one or more lower sealing surfaces 240L may be selected to withstand the temperature and pressure of the application, compatibility with any chemicals or compounds to which will be exposed, as well as to be sufficiently soft so as to not damage the surface of the one or more upper petals 220U and/or the one or more lower petals 220L after repeated cycling, closing, sealing, and/or contact.

In some embodiments, the one or more upper sealing surfaces 240U and/or the one or more lower sealing surfaces 240L may extend around all or a portion of the interface surfaces between the valve body 230 and the one or more upper petals 220U and/or the one or more lower petals 220L, respectively. The interface surfaces are defined as the portions which the one or more upper petals 220U and/or the one or more lower petals 220L would otherwise contact the valve body 230 when the reed valve 200 is in the CLOSED state or position. The one or more upper sealing surfaces 240U and/or the one or more lower sealing surfaces 240L may be disposed within at least the interface surface between the one or more upper petals 220U and/or the one or more lower petals 220L and the valve body 230 when the reed valve 200 is in the CLOSED state or position.

In some embodiments, the one or more upper sealing surfaces 240U and/or the one or more lower sealing surfaces 240L may be disposed around at least a portion of a peripheral region 260 of the valve body 230. The upper peripheral region 260 may include an area extending around the upper aperture(s) 212A-212D of the one or more passageways 210A-210D formed in the valve body 230. Similarly, although not shown in FIGS. 2A-2D, a lower peripheral region 260 may include an area extending around the lower aperture(s) 214A-214D of the one or more passageways 210 formed in the valve body 230.

In the example reed valve depicted in FIGS. 2A-2D, single, continuous, upper sealing surface 240U extends around the entirety of the upper peripheral region 260 of the valve body 230 and a single, continuous, lower sealing surface 240L extends around the entirety of the lower peripheral region 260 of the valve body 230. As depicted in FIGS. 2A-2D, in embodiments, the upper sealing surface 240U and the lower sealing surface 240L may be physically coupled together using a web member that extends at least partially about the periphery of the upper sealing surface 240U and the lower sealing surface 240L. In other embodiments all or a portion of either or both the upper sealing surface 240U and/or the lower sealing surface 240L may extend on, about, or across only a portion of the upper peripheral region 260 of the valve body 230. For example, in some embodiments, the upper sealing surface 240U may extend around only a portion of the upper peripheral region 260, such as along a distal region of the peripheral region 260 (e.g., the portion of the peripheral region 260 opposite the attachment fixtures 222A-222D coupling the upper petal 220U to the valve body 230), around only a proximate region of the peripheral region 260 (e.g., the portion of the peripheral region 260 proximate the attachment fixtures 222A-222D coupling the upper petal 220U to the valve body 230), and/or around only one or more of the side regions of the peripheral region 260 (e.g., the region disposed between the distal and proximate regions) and/or between the proximal and distal regions of the peripheral regions adjacent to the one or more passageways. In some embodiments, either or both the one or more upper sealing surfaces 240U and/or the one or more lower sealing surfaces 240L may be asymmetrical. For example, the height and/or width and/or cross-sectional shape of either or both the one or more upper sealing surfaces 240U and/or the one or more lower sealing surfaces 240L may taper. In one embodiment, the height of either or both the one or more upper sealing surfaces 240U and/or the one or more lower sealing surfaces 240L in the proximate region of the peripheral region 260 may be smaller than the height of either or both the one or more upper sealing surfaces 240U and/or the one or more lower sealing surfaces 240L in the distal region of the peripheral region 260.

FIG. 3A is perspective view of an illustrative reed valve 300 in which the upper petal 220U is depicted in a CLOSED position or state, in accordance with at least one embodiment described herein. FIG. 3B is a lower perspective view of the illustrative reed valve 300 depicted in FIG. 3A and in which the lower apertures 214A-214D of each of the plurality of passageways 210A-210D is visible, in accordance with at least one embodiment described herein. The lower petal 220L has been omitted in both FIGS. 3A and 3B to more clearly show the lower sealing surface 240L.

As depicted in FIGS. 3A and 3B, when the upper petal 220U of reed valve 300 is in the CLOSED state or position, the lower surface of the upper petal 220U contacts the upper sealing surface 240U disposed, deposited, on or otherwise formed in, on, about, or across all or a portion of the second valve body portion 230B, thereby preventing reverse fluid flow through the reed valve 300. In embodiments, the upper petal 220U of reed valve 300 is in the CLOSED state or position when the pressure on the downstream side of the reed valve 300 exceeds the pressure on the inlet side of the reed valve 300. Such a condition may exist, for example as depicted in FIG. 1, when a negative differential pressure (outlet pressure>inlet pressure) exists across the reed valve 300.

Figures 4A, 4B:
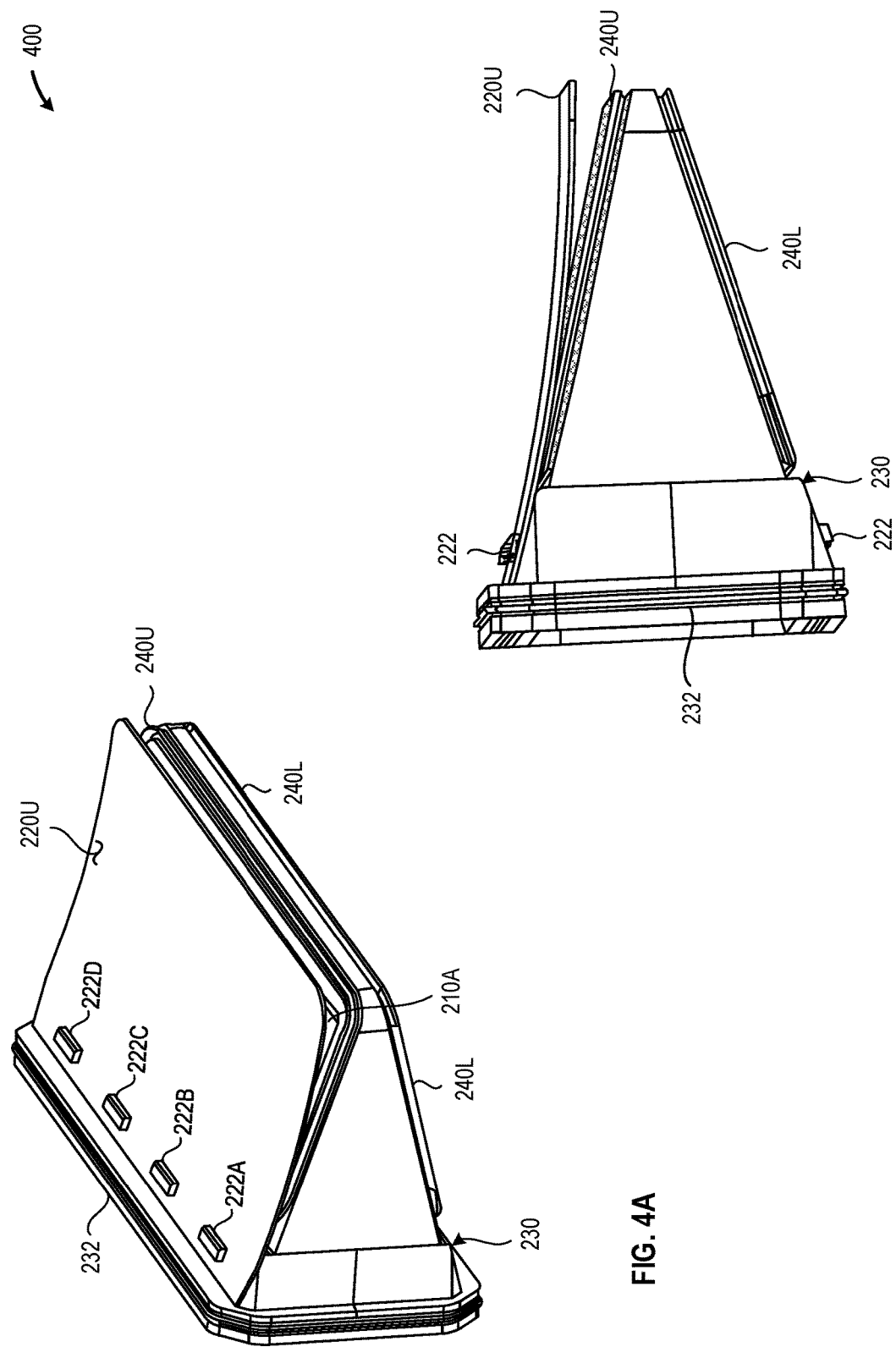
FIG. 4A is perspective view of an illustrative reed valve in which the upper petal is depicted in slightly OPEN position or state, in accordance with at least one embodiment described herein.
FIG. 4B is a side elevation view of the illustrative reed valve depicted in FIG. 4A and in which the upper sealing surface and the lower sealing surface are more clearly visible, in accordance with at least one embodiment described herein.

FIG. 4A is perspective view of an illustrative reed valve 400 in which the upper petal 220U is depicted in slightly OPEN position or state, in accordance with at least one embodiment described herein. FIG. 4B is a side elevation view of the illustrative reed valve 400 depicted in FIG. 4A and in which the upper sealing surface 240U and the lower sealing surface 240L are more clearly visible, in accordance with at least one embodiment described herein.

As depicted in FIGS. 4A and 4B, when the upper petal 220U of reed valve 400 is in the slightly OPEN state or position, only a portion of the lower surface of the upper petal 220U contacts the upper sealing surface 240U, thereby permitting forward fluid flow through the reed valve 400. In embodiments, the upper petal 220U of reed valve 300 is in the slightly OPEN state or position when a slight positive differential pressure (inlet pressure>outlet pressure) exists across the reed valve 400.

Figure 5B:
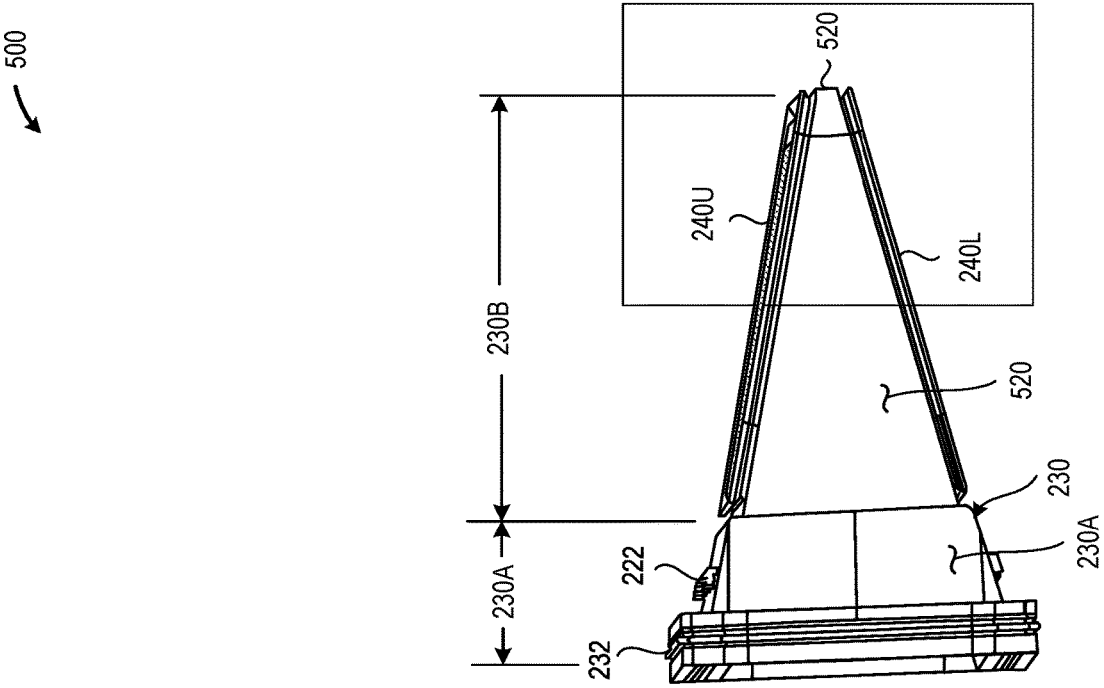
FIG. 5B is a side elevation of the illustrative reed valve 00 depicted in FIG. 5A, in accordance with at least one embodiment described herein.
Figure 5A:
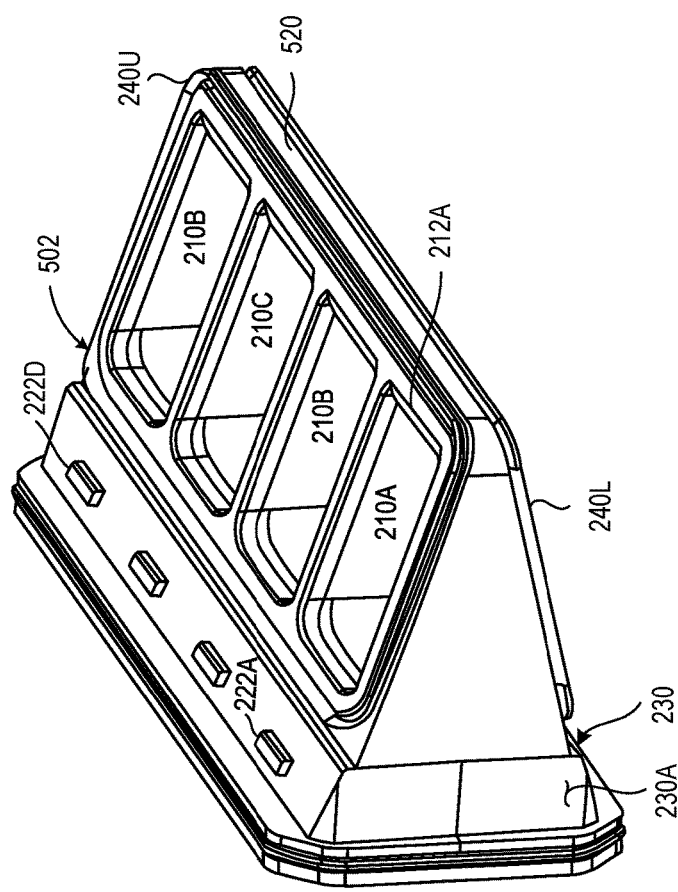
FIG. 5A is a perspective view of an illustrative reed valve in which the upper petal and the lower petal have been removed to more clearly show details of the upper sealing surface and the lower sealing surface and a sealing assembly that includes the sealing surfaces and a web member that physically couples the sealing surfaces on three sides of the valve body, in accordance with at least one embodiment described herein.
Figure 5D:
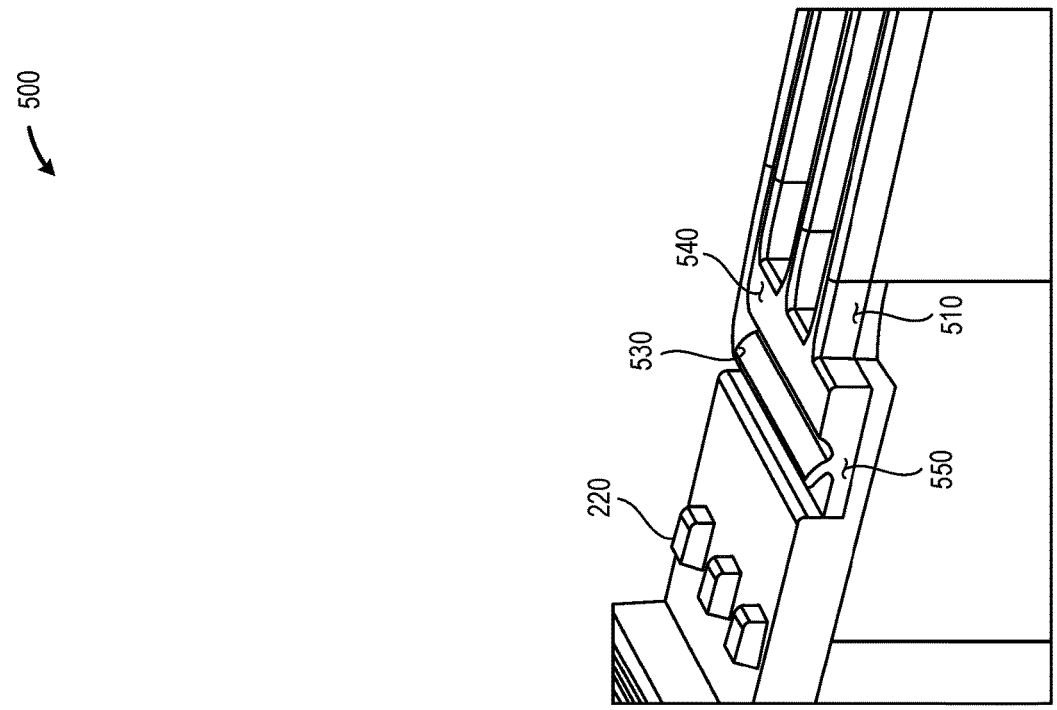
FIG. 5D is an enlarged side elevation of the reed valve depicted in FIGS. 5A-5C, in accordance with at least one embodiment described herein.
Figure 5C:
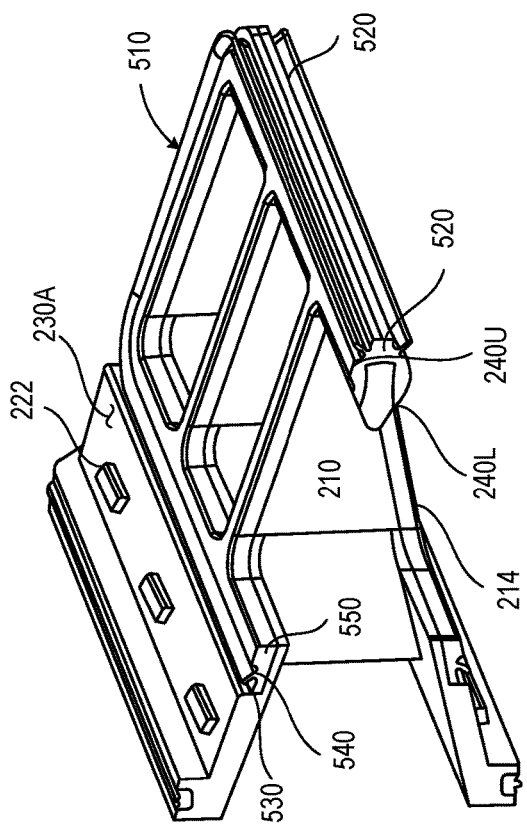
FIG. 5C is a sectional view of the illustrative reed valve depicted in FIGS. 5A and 5B that more clearly depicts the details of the sealing assembly, including the sealing surfaces, the outer web portion connecting the sealing surfaces on three sides of the valve body, a first sealing surface portion, a second sealing surface portion, and a linking member connecting the first and the second sealing surface portions, in accordance with at least one embodiment described herein.

FIG. 5A is a perspective view of an illustrative reed valve 500 in which the upper petal 220U and the lower petal 220L have been removed to more clearly show details of the upper sealing surface 240U and the lower sealing surface 240L and a sealing assembly 510 that includes the sealing surfaces 240 and a web member 520 that physically couples the sealing surfaces 240 on three sides of the second portion of the valve body 230B, in accordance with at least one embodiment described herein. FIG. 5B is a side elevation of the illustrative reed valve 500 depicted in FIG. 5A, in accordance with at least one embodiment described herein. FIG. 5C is a sectional view of the illustrative reed valve 500 depicted in FIGS. 5A and 5B that more clearly depicts the details of the sealing assembly 510, including the sealing surfaces 240, the outer web portion 520 connecting the sealing surfaces on three sides of the second portion of the valve body 230B, a first sealing surface portion 530, a second sealing surface portion 540, and a linking member 550 connecting the first and the second sealing surface portions, in accordance with at least one embodiment described herein. FIG. 5D is an enlarged side elevation of the reed valve depicted in FIGS.

5A-5C, in accordance with at least one embodiment described herein. FIG. 5E is a dimensioned side elevation sectional view of an example sealing surface 240, in accordance with at least one embodiment described herein. FIG. 5F is a partial sectional view of an example sealing surface 240, in accordance with at least one embodiment described herein.

Referring first to FIGS. 5A and 5B, in at least some embodiments, an outer web portion 520 may physically couple at least a portion of the perimeter of the upper sealing surface 240U to at least a portion of the perimeter of the lower sealing surface 240L. For example, the outer web portion 520 may extend from the two sides and the distal end of the perimeters of both the upper sealing surface 240U and the lower sealing surface 240L such that the second portion of the valve body 230B may be inserted at least partially into the three-sided, single piece sealing assembly 510 as depicted in FIG. 5A.

Referring next to FIGS. 5C-5E, the three-sided "pocket" construction of the single piece sealing assembly 510 includes both the upper sealing surface 240U, the lower sealing surface 240L and the outer web portion 520 that physically couples the upper sealing surface 240U to the lower sealing surface 240L. Also visible in FIG. 5C are construction details of the upper sealing surface 240U and the lower sealing surface 240L. Each of the upper and the lower sealing surfaces includes a first sealing surface portion 530 and a second sealing surface portion 540 physically connected by a linking member 550. As depicted in FIG. 5C, in some embodiments, the first sealing surface portion 530 may include a member that extends outwardly, at an angle, from the linking member 550 and the second sealing surface portion 540 may include a generally tapered or trapezoidal member physically coupled to the linking member 550.

Referring next to FIG. 5E, in at least some embodiments, the first sealing surface portion 530 may have a thickness of from about 0.01 inches to about 0.25 inches. In at least some embodiments, such as depicted in FIG. 5E, the first sealing surface portion 530 may have a thickness of about 0.015 inches. In at least some embodiments, the second sealing surface portion 540 may have a thickness of from about 0.01 inches to about 0.25 inches. In at least some embodiments, such as depicted in FIG. 5E, the second sealing surface portion 540 may have a thickness of about 0.02 inches. In at least some embodiments, the linking member 550 may have a thickness of from about 0.01 inches to about 0.25 inches. In at least some embodiments, such as depicted in FIG. 5E, the linking member 550 may have a thickness of about 0.03 inches. It should be appreciated that the reed valve 500 according to the present disclosure is not limited to these dimensions unless specifically claimed as such. The 0.013 dimension of the second sealing surface portion 540 may taper from about 0 to any dimension less than 0.013 at the base. It should be appreciated that any of these dimensions may be increased and/or decreased by 25% or more.

With reference to FIG. 5F, in at least one embodiment, the seal profile is similar in concept to a hydraulic seal. In the closed position, as the pressure of the discharged combustion air 102 increases, the first sealing surface portion 530 is pushed into the mating part (e.g., petal 220) with increasing force at the same time the petal 220 is being pushed harder into the sealing surface portion 530 and/or second sealing surface portion 540. For example, as the pressure of the discharged combustion air 102 increases while the reed valve is in the closed position, the first sealing surface portion 530 and/or second sealing surface portion 540 is pushed into the mating part (e.g., petal 220) with increasing force at the same time the petal 220 is being pushed harder into the sealing surface portion 530 and/or second sealing surface portion 540. In short, sealing is enhanced as the operating pressure increases.

Figure 6:
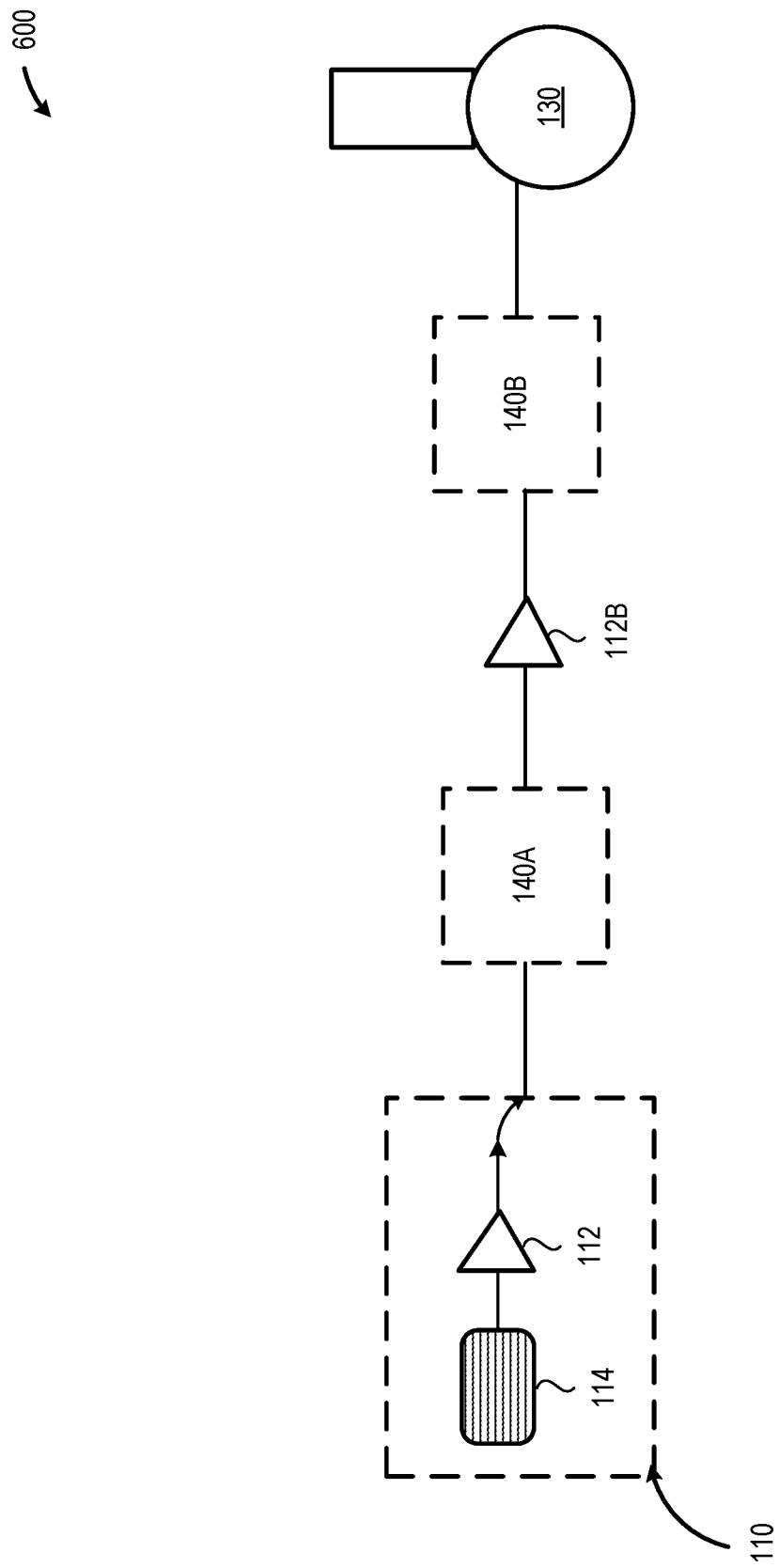
FIG. 6 is a block diagram depicting another illustrative engine system that includes one or more reed valves such as depicted in FIGS. 2, 3, 4, and 5, in accordance with at least one embodiment described herein.

FIG. 6 is a block diagram depicting another illustrative engine system 600 that includes one or more reed valves such as depicted in FIGS. 2, 3, 4, and 5, in accordance with at least one embodiment described herein. As depicted in FIG. 6, in embodiments, combustion air may be admitted to engine system 600 via one or more airbox assemblies 110, each including one or more reed valves 112 and/or one or more air filters 114. As depicted in FIG. 6, in some embodiments, the engine system 600 may include a plurality of throttle bodies 140A and 140B. In such embodiments, a second reed valve 112B may be disposed between throttle body 140A and throttle body 140B to prevent reverse flow through the engine system 140, for example when the throttle coupled to throttle body 140A is opened either before or contemporaneous with opening of the throttle coupled to throttle body 140B.

Figure 7:
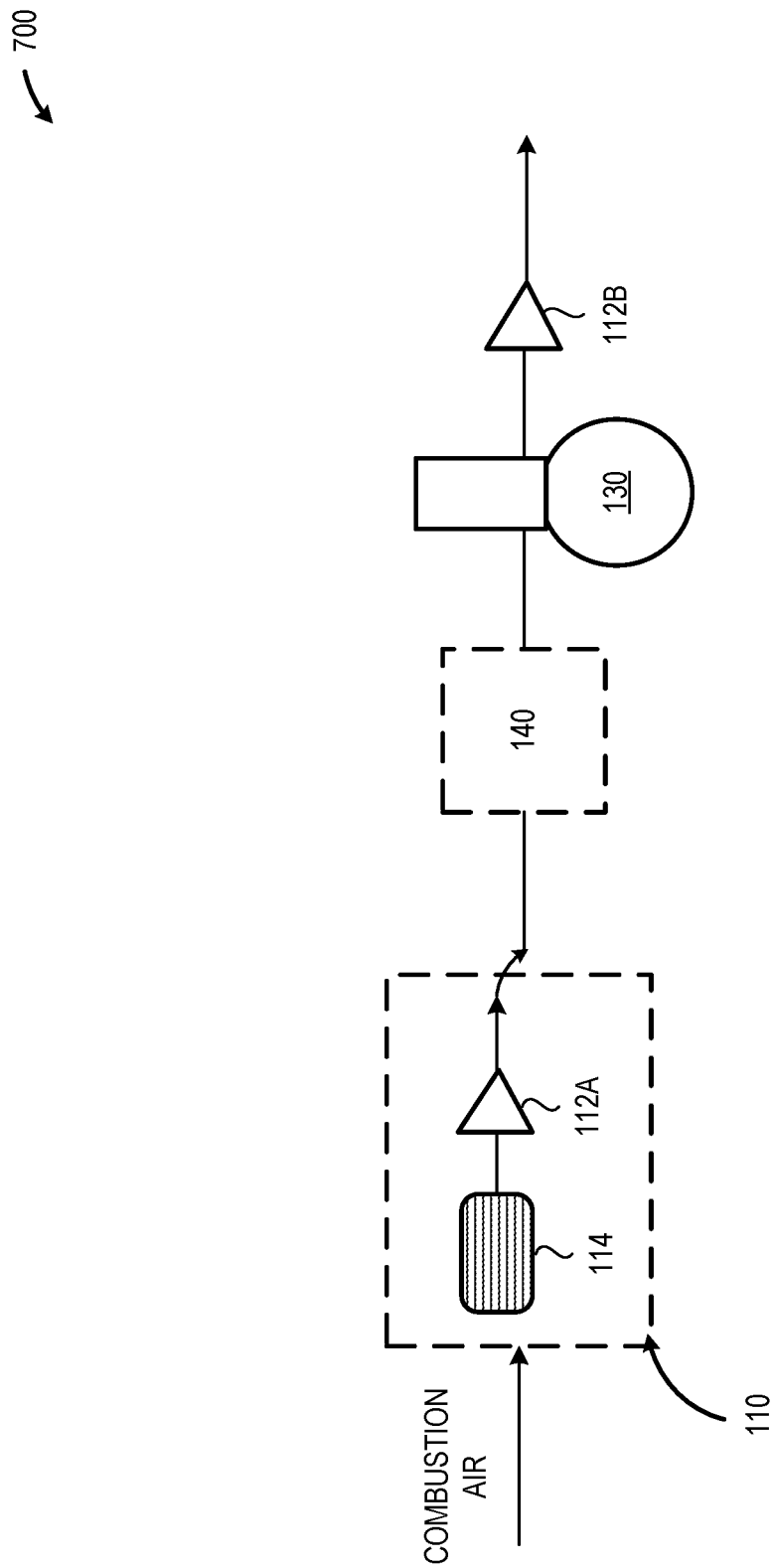
FIG. 7 is a block diagram depicting another illustrative engine system that includes a plurality of reed valves such as depicted in FIGS. 2, 3, 4, and 5, in accordance with at least one embodiment described herein.

FIG. 7 is a block diagram depicting another illustrative engine system 700 that includes a plurality of reed valves such as depicted in FIGS. 2, 3, 4, and 5, in accordance with at least one embodiment described herein. As depicted in FIG. 7, in some embodiments a first reed valve 112A may be disposed in an airbox assembly 110 and a second reed valve 112B may be disposed on the exhaust side of the engine 130. Ambient combustion air is drawn through the first reed valve 112A. The second reed valve 112B prevents the flow of exhaust gasses back into the engine 130.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the claims.

What is claimed is:

1. A reed valve comprising:
   a valve body including a first inlet and a first outlet, wherein the valve body comprises a base including the first inlet and a tapered portion extending from the base, the tapered portion including the first outlet on a first face and a second outlet on a second face, the first face and the second face tapering toward each other at a distal end thereof; and
   a first seal overmolded about a portion of the valve body and disposed at least partially about the first outlet;
   wherein the first seal comprises a first sealing surface portion and a second sealing surface portion disposed on the first face, the first sealing surface portion being spaced apart from and disposed between the second sealing surface portion and base, the second sealing surface portion including a tapered cross-section and extending around at least a portion of the first outlet; and
   wherein the first outlet is configured to be covered by only one petal which extends continuously across the first outlet, the one petal configured to move between:
      an open position configured to permit flow through first outlet; and
      a closed position where the one petal contacts the first seal preventing flow through the first outlet.

2. The reed valve of claim 1, wherein the first sealing surface portion extends outwardly away from the first face and generally towards the base.

3. The reed valve of claim 2, wherein a cross-section of the first sealing surface portion tapers from a larger cross-section proximate the first face to a smaller cross-sectional at a distal end thereof.

4. The reed valve of claim 1, further comprising a linking member coupling the first sealing surface portion to the second sealing surface portion.

5. The reed valve of claim 4, wherein the first sealing surface portion extends outwardly away from the linking member and generally towards the base.

6. The reed valve of claim 5, wherein the second sealing surface portion includes a tapered cross-section.

7. A reed valve comprising:
- a valve body including a first inlet and a first outlet, wherein the valve body comprises a base including the first inlet and a tapered portion extending from the base, the tapered portion including the first outlet on a first face and a second outlet on a second face, the first face and the second face tapering toward each other at a distal end thereof; and
- a first seal overmolded about a portion of the valve body and disposed at least partially about the first outlet, wherein the first seal comprises a first sealing surface portion and a second sealing surface portion disposed on the first face;
- wherein the first sealing surface portion is spaced apart from and disposed between the second sealing surface portion and base and extends outwardly away from the first face generally towards the base, the first sealing surface portion having a cross-section that tapers from a larger cross-section proximate the first face to a smaller cross-sectional at a distal end thereof;
- wherein the second sealing surface portion extends around at least a portion of the first outlet; and
- wherein the first outlet is configured to be covered by only one petal which extends continuously across the first outlet, the one petal configured to move between:
  - an open position configured to permit flow through first outlet; and
  - a closed position where the one petal contacts the first seal preventing flow through the first outlet.

8. The reed valve of claim 7, wherein the second sealing surface portion includes a tapered cross-section.

9. The reed valve of claim 7, further comprising a linking member coupling the first sealing surface portion to the second sealing surface portion.

10. The reed valve of claim 9, wherein the first sealing surface portion extends outwardly away from the linking member and generally towards the base.

11. The reed valve of claim 10, wherein the second sealing surface portion includes a tapered cross-section.

* * * * *